(12) United States Patent
Amir et al.

(10) Patent No.: US 8,046,486 B2
(45) Date of Patent: *Oct. 25, 2011

(54) ACTIVE CLIENT BUFFER MANAGEMENT

(75) Inventors: Israel Amir, Princeton, NJ (US);
Maksim Azarov, Piscateway, NJ (US)

(73) Assignee: Lee Capital LLC, Wilmington, DE (US)

( * ) Notice: Subject to any disclaimer, the term of this patent is extended or adjusted under 35 U.S.C. 154(b) by 151 days.

This patent is subject to a terminal disclaimer.

(21) Appl. No.: 12/511,031

(22) Filed: Jul. 28, 2009

(65) Prior Publication Data

US 2009/0285282 A1    Nov. 19, 2009

Related U.S. Application Data

(63) Continuation of application No. 10/455,277, filed on Jun. 5, 2003, now Pat. No. 7,581,019.

(60) Provisional application No. 60/386,062, filed on Jun. 5, 2002.

(51) Int. Cl.
*G06F 15/16* (2006.01)
(52) U.S. Cl. .................. 709/235; 370/235; 370/503
(58) Field of Classification Search .................. 709/235; 370/235, 503
See application file for complete search history.

(56) References Cited

U.S. PATENT DOCUMENTS

| | | |
|---|---|---|
| 6,181,872 B1 | 1/2001 | Yamane et al. |
| 6,212,233 B1 | 4/2001 | Alexandre et al. |
| 2002/0097750 A1 | 7/2002 | Gunaseelan et al. |
| 2003/0112758 A1 | 6/2003 | Pang et al. |

*Primary Examiner* — Kyung H Shin
(74) *Attorney, Agent, or Firm* — Stolowitz Ford Cowger LLP

(57) ABSTRACT

Active client buffer management methods, systems, and apparatus for transmitting electronic data from a server to a client having a limited receive buffer are disclosed. The receive buffer is managed by determining a consumption rate at the client and adjusting the transmission rate of the server responsive to the determined consumption rate to manage the fill level of the receive buffer.

26 Claims, 4 Drawing Sheets

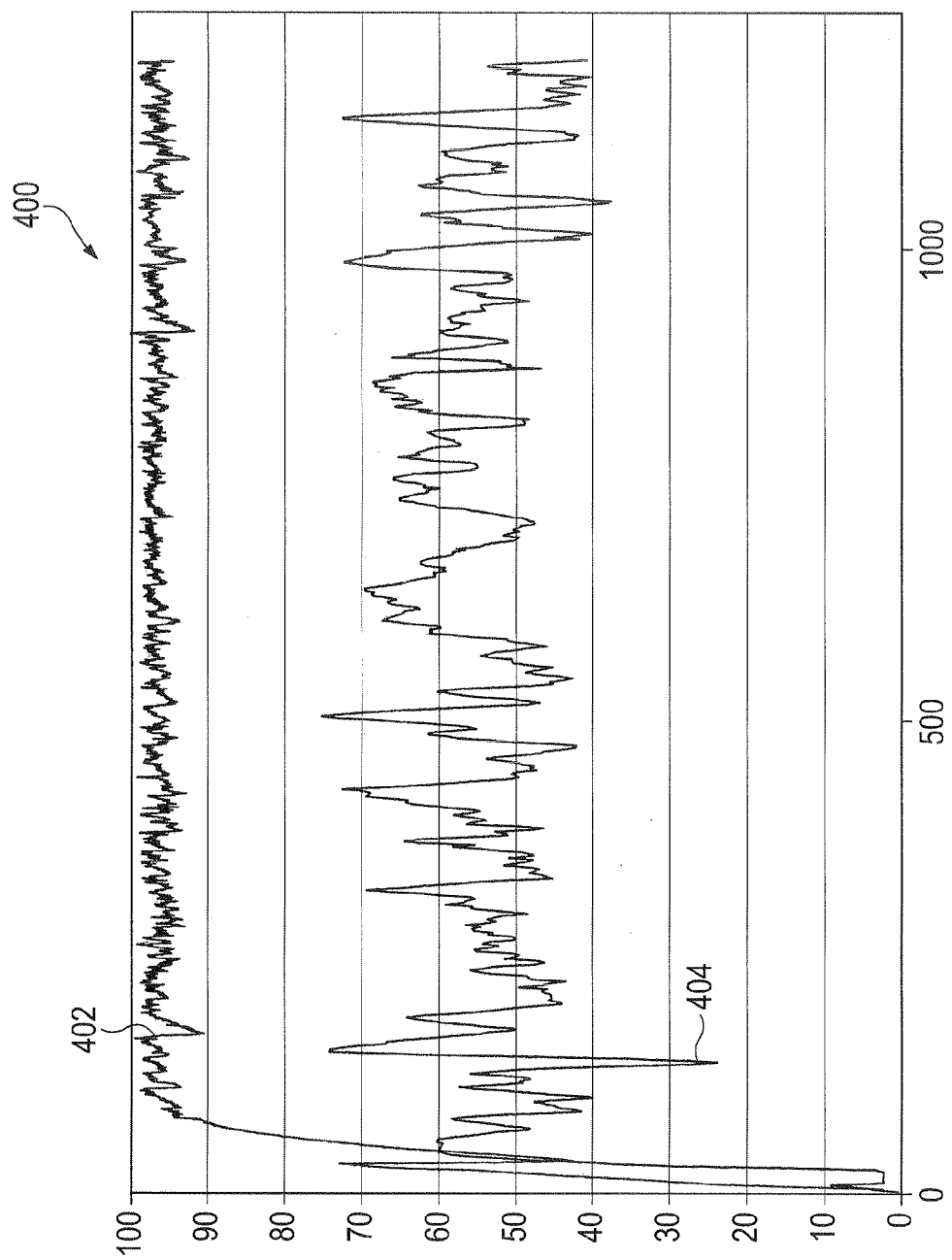

ACTIVE CLIENT BUFFER MANAGEMENT

CROSS REFERENCE TO RELATED APPLICATIONS

This application is a continuation of U.S. patent application Ser. No. 10/455,277, filed Jun. 5, 2003, now issued U.S. Pat. No. 7,581,019, which is related to and claims the benefit of U.S. Provisional Application No. 60/386,062, entitled TRANSMISSION RATE OPTIMIZATION FOR IMPROVED QOS, filed on Jun. 5, 2002, both of which are incorporated here by reference.

FIELD OF THE INVENTION

The present invention relates to electronic data transfer over a network and, more particularly, to streaming content to clients having a limited buffer size.

BACKGROUND OF THE INVENTION

Electronic data such as multimedia content (MM) is routinely transmitted from a server to a client over a network. A receive buffer within the client functions to accommodate the differences between the transmission rate of the electronic data between the server and the client and the consumption rate of the electronic data at the client. The receive buffer empties during periods when the consumption rate of the electronic data is higher than the transmission rate and fills when the consumption rate is lower than the transmission rate.

Typically, prior to the presentation of the electronic data at the client, the receive buffer is filled with electronic data. If the receive buffer is depleted during the presentation of electronic data, disruptions in the presentation of the electronic data will occur. The amount of data within the receive buffer (referred to herein as the buffer fill level) may be affected by network conditions and/or the consumption rate of the electronic data at the client. Network conditions, especially in home wireless networks, change as a function of time, thereby varying the transmission rate of the network. Additionally, in variable bit rate (VBR) streaming systems, the consumption rate of the electronic data at the client varies as a function of time as well.

Two known approaches for transmitting data to avoid depletion of the receive buffer include an averaging transmission system and a buffer fill level feedback system. In an averaging transmission system, the server transmits data at an average transmission rate based on the average bit rate for the entire electronic data file. In a buffer fill level feedback system, the client informs the server when the buffer is above a high fill level or below a low fill level. The server then transmits at a higher rate when the buffer is below a low fill level and at a lower rate when the buffer is above a high fill level. In both of these approaches, a relatively large receive buffer is necessary to guard against depletion of the receive buffer. The use of a relatively large receive buffer, however, increases the size and cost of the client, thus affecting adversely portability and profitability.

Accordingly, methods, systems, and apparatus are needed to alleviate the impact of VBR streaming and bandwidth variations on performance that are not subject to the above limitation. The present invention fulfills this need among others.

SUMMARY OF THE INVENTION

The present invention provides active client buffer management methods, systems, and apparatus for transmitting electronic data from a server to a client having a receive buffer. The receive buffer is managed by determining a consumption rate at the client and adjusting the transmission rate of the server responsive to the determined consumption rate to manage the fill level of the receive buffer.

BRIEF DESCRIPTION OF THE DRAWINGS

FIG. 4 is a graph comparing a buffer fill level for a transmission system in accordance with the present invention to a buffer fill level in a known transmission system.

DETAILED DESCRIPTION OF THE INVENTION

Figure 1:
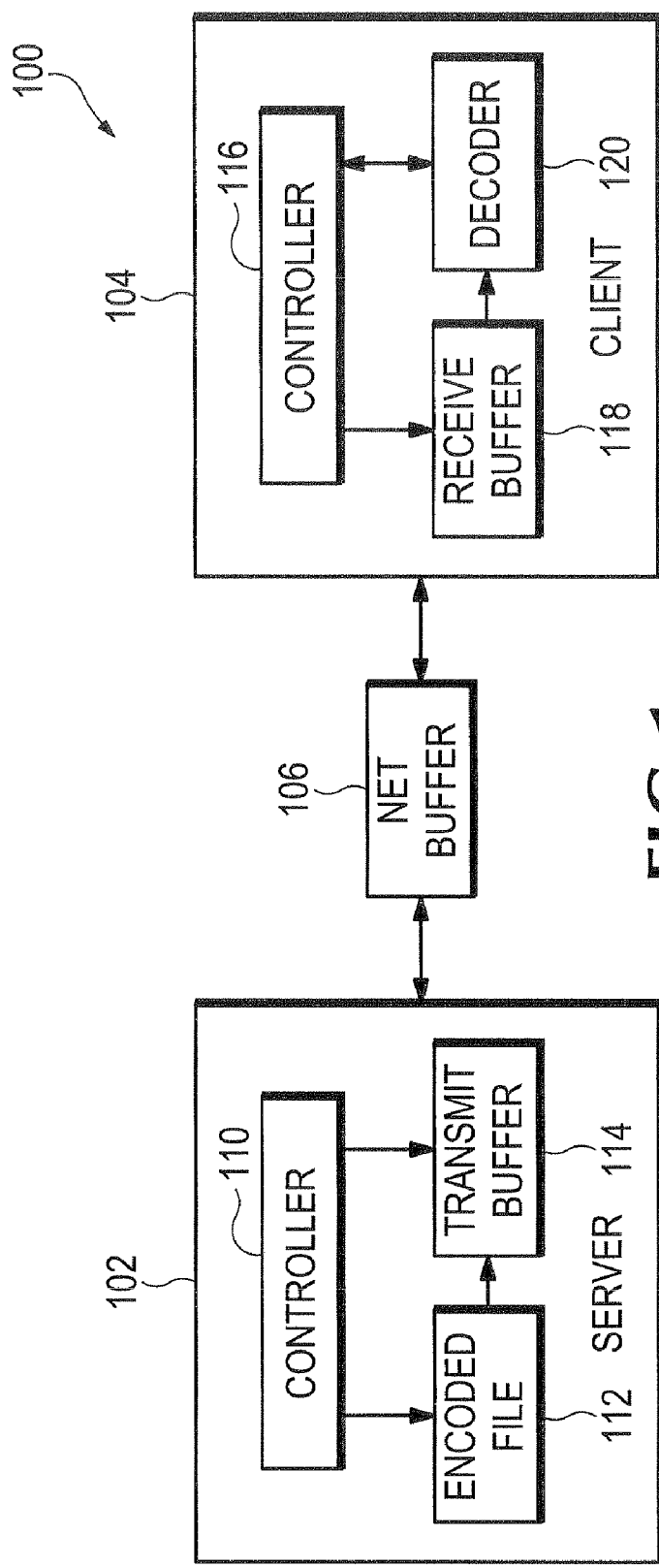
FIG. 1 is a block diagram of an exemplary transmission system in accordance with the present invention.

FIG. 1 depicts an exemplary transmission system 100 for transmitting electronic data from a server 102 to a client 104. The electronic data is essentially any information capable of being represented in a digital form. In an exemplary embodiment, the electronic data is streaming multimedia (MM) content. The illustrated transmission system 100 includes a net buffer 106 that represents buffering in the transmission system 100 between the server 102 and the client 104, which delays electronic data passing there between.

The server 102 processes electronic data for transmission to the client 104. In the illustrated embodiment, the server 102 includes a controller 110 coupled to an encoded file source 112 and a transmit buffer 114. In exemplary embodiments, the encoded file source 112 supplies electronic data encoded using a known variable bit rate (VBR) encoding scheme (e.g., mp3, MPEG, etc.). In certain exemplary embodiments, the encoded file source 112 is a computer readable storage medium, e.g., a conventional memory, a digital versatile disc (DVD), or other such storage medium, which stores encoded electronic data for transmission from the server 102. In an alternative exemplary embodiment, the encoded file source 112 is an encoder that receive electronic data from the controller and encodes it using a known encoding scheme. The encoded file source 112 passes the encoded electronic data to the transmit buffer 114 for buffering prior to transmission from the server 102. In alternative embodiments, the electronic data does not require buffering, thus eliminating the need for the transmit buffer 114. Suitable controllers 110, encoded file sources 112, and transmit buffers 114 for use in the server 102 will be readily apparent to those of skill in the art of network signal processing.

The server 102 is able to regulate the transmission rate of the electronic data onto the network. In an exemplary embodiment, the controller 110 controls the encoded file source 112, the transmit buffer 114, and the transmission rate of the server 102. In certain exemplary embodiments, the controller 110 also receives data from the client 104, such as realtime streaming protocol (RTSP) or realtime transport control protocol (RTCP) information, for use by the controller 110 in controlling the transmission rate of the server 102, which is described in detail below. In certain exemplary embodiments, the server 102 is part of a digital versatile disc (DVD) device that is capable of connection to a network.

The client 104 processes electronic data received from the transmitter 102. In the illustrated embodiment, the client 104 includes a controller 116 coupled to a receive buffer 118 and a decoder 120. In an exemplary embodiment, the receive buffer 118 receives electronic data from the server 102 and passes electronic data to the decoder 120 for decoding using a decoding scheme. The decoding scheme reverses the encoding of the electronic data from the encoded file source to derive the electronic data. In certain exemplary embodiments, where the electronic data is encoded using a VBR encoding scheme, the decoder 120 decodes the electronic data using a VBR decoding scheme. Suitable controllers 116, receive buffers 118, and decoders 120 for use in the client 104 will be readily apparent to those of skill in the art of network signal processing.

During processing of the electronic data, the client 104 draws electronic data from the receiver buffer 118. The rate at which the electronic data is drawn from the receive buffer 118 is referred to herein as the consumption rate. In many transmission schemes, such as VBR transmission schemes, the consumption rate varies during the processing of the electronic data. In an exemplary embodiment, the controller 116 controls the receive buffer 118 and the decoder 120 to facilitate the processing of the electronic data. During processing of the electronic data, the consumption rate at which the electronic data is drawn from the receive buffer 118 is determined by the decoder 120. In certain exemplary embodiments, as is discussed in detail below, the controller 110 also generates data for transmission to the server 102, e.g., using RTSP or RTCP, that communicates commands as well as network delay and/or consumption rate information to the server 102 for use in adjusting the transmission rate.

Figure 2:
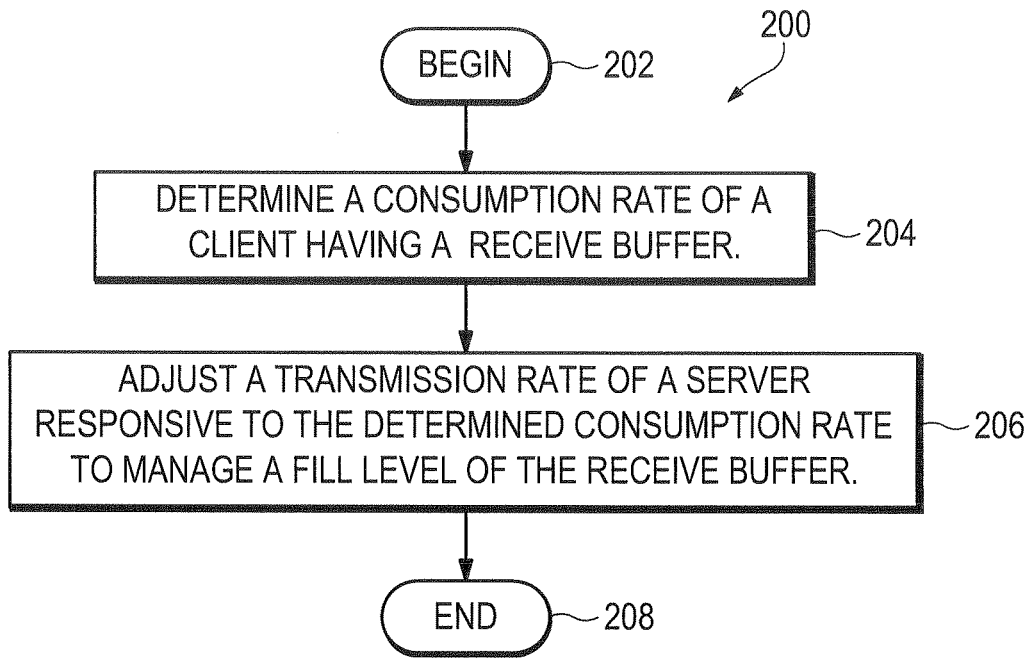
FIG. 2 is a flow chart for determining transmission rate in accordance with an exemplary embodiment of the present invention.

FIG. 2 depicts a flow chart 200 of exemplary steps for controlling the transmission rate of a server 102 (FIG. 1) to actively manage a receive buffer 118 (FIG. 1) in a client 104 (FIG. 1). In general overview, processing begins at block 202 with a determination of a consumption rate for the client at block 204. The transmission rate of the server is then adjusted at block 206 responsive to the determined packet consumption rate, with processing ending at block 208. In an exemplary embodiment, the current transmission rate at the server is adjusted such that it is at least substantially equal to the current consumption rate at the client. The steps depicted in the flow chart 200 are now described in detail.

At block 204, the server determines the consumption rate of a client. In an exemplary embodiment, the electronic data is encoded into VBR packets of a known size (or drawn from a file containing VBR content) and the server estimates the packet consumption rate for the packets at the receiver prior to transmission of the electronic data by the server, referred to herein as a server side system. In an alternative exemplary embodiment, the server determines the current packet consumption rate of the client from data fed back to the server by the client, referred to herein as a client side system.

In an exemplary server side system, the consumption rate for the VBR packets is determined by examining the VBR packets at the server. In an exemplary embodiment, each VBR packet includes a time stamp indicating when that packet should be processed (i.e., consumed) by the decoder in the client. Thus, the future consumption rate for these packets is determinable by parsing the packets in a known manner to derive the time stamps and, then, calculating the consumption rate by dividing the number of fixed size VBR packets between the derived time stamps by the difference between the time stamps.

In an exemplary client side system, the current consumption rate for the VBR packets is determined by examining the VBR packets at the client. As described above, each VBR packet includes a time stamp indicating when that packet should be processed (i.e., consumed) by the client. The current consumption rate for those packets is then determined by parsing the packets in a known manner to derive the time stamps and then calculating (either at the client or at the server) the consumption rate by dividing the number of fixed size VBR packets to be presented between the derived time stamps by the difference in the time stamps. If the consumption rate is calculated at the server, the time stamps are passed from the client to the server. If the consumption rate is calculated at the client, the consumption rate is passed from the client to the server. The consumption rate and/or the data for calculating the consumption rate is supplied from the client to the server over a network connection using conventional RTSP or RTCP protocol, for example. In the client side system, the server does not need to unpack the packets for transmission in order to compute consumption rates. Accordingly, transmission efficiency is maintained in the server.

At block 206, the transmission rate is adjusted responsive to the consumption rate estimated at block 204. In an exemplary embodiment, a receive buffer 118 (FIG. 1) is filled to a predefined target level, referred to herein as the optimum fill level. The transmission rate is then adjusted such that it is substantially equal to the current consumption rate at the client, thereby maintaining the receive buffer 118 at substantially the optimum fill level, e.g., plus or minus 5%. After a transmission is complete, processing ends at block 206.

To adjust the transmission rate in an exemplary embodiment of the server side system described above, a delay period is estimated that represents a delay period between the determination of the consumption rate for one or more packets at the server and the time when these one or more packets are actually consumed. In accordance with this embodiment, the delay period includes a forward delay (e.g., one-half a round trip time from the server to the client and back) and the time to consume what is currently in the receive buffer. Also in accordance with this embodiment, the transmission rate is further adjusted responsive to the estimated delay period such that the transmission rate changes by the consumption rate when the packets for which the consumption rate was determined are actually being consumed.

In this system, three factors may affect the achievement of optimal results. First, the optimum fill level may be different from the actual fill level. Second, the forward delay cannot always be assumed to be easily derived from the round trip time (RTT). In many cases the Ri I is not approximately twice the forward delay, e.g. in wireless configurations most of the RTT delay is attributable to the forward delay. Finally, clock inaccuracies on the client and server can drift apart causing long-term errors in consumption rate and buffer fill positions. It is important to note that in most cases, the buffer size is much larger that the RU and thus an accurate estimate of the forward delay is not crucial.

In order to address these three factors to improve buffering efficiency, a feedback method is employed. In this method other parameters are provided via RTCP, for example, to allow more accurate estimates of the forward delay. According to one exemplary embodiment, of the invention, the RTCP further provides one or more of the following measured or calculated parameters: buffer fill state at the time the RTCP packet is sent, the consumption rate at the time the packet is consumed, and the current clock state.

In an exemplary embodiment, the forward delay is the only estimated parameter. Errors in this estimated parameter are reduced through one or more of the following: (1) network topology knowledge, which allows an easy estimation of forward delay if it dominates, (2) synchronization of the server and client clocks when the system is not congested, which allows the use of RTCP time stamps as an estimate of RTT, and (3) estimation of the forward delay from the RTI as FWD=RTIj2, which may provide a sufficient estimate.

To adjust the transmission rate in an alternative exemplary embodiment of the server side system, it is contemplated that satisfactory results may be obtained by adjusting the transmission rate of the packets responsive to the calculated consumption rate at the time the packets are being transmitted by the server. However, this effectively averages the transmission rate. Therefore, because the average transmission rates over fairly long periods of time can stay lower or higher than an overall average for an entire transmission, a "creep" in the receive buffer fill position may cause it to overflow (or under flow).

In an exemplary server side system, the transmission rate is adjusted based on the current consumption rate at the client. In accordance with this embodiment, the current consumption rate represents the consumption rate of packets that are actually being consumed. Thus, a determination of the delay between the transmission of a packet and the consumption of the packet is unnecessary to determine the consumption rate. The consumption rate or parameters for determining the consumption rate are passed from the client to the server via RTCP, for example.

An exemplary mathematical model is now described with reference to FIG. 1 for VBR encoded MM packets. Initially, the server 102 estimates the delay between the time it sends a packet and the time the decoder on the client 104 is expected to consume it. Furthermore, the server 102 transmits the packets at the rate of "current" consumption by the decoder in the client 102. If we denote $\tau$ as the delay between the time a packet is transmitted and the time it is consumed by the decoder and $C_s(\tau)$ is the consumption rate of a packet to be transmitted $\tau$ seconds later, the transmitter transmission rate $T_r(t)$ is shown in equation (1).

$$T_r(t)=C_s(t-\tau)_1 \quad (1)$$

where $T_r(t)$ is the transmission rate at time \\$t_{11}$ and where $C_s(t)$ represents the consumption rate of the packet transmitted at time "t." In this approach, the amount of data in the buffer remains at approximately the same level at all times as long as the network provides the necessary bandwidth.

In an exemplary embodiment, the consumption rate is estimated from the timestamp that accompanies each packet. The time stamp provides information on the expected consumption time of the packet by the decoder. In this embodiment, the transmitter is configured to unpack the packet and extract the time stamp to estimate the consumption rate (e.g., using information from previous packets and the length of the packets).

In general, packets in transit may cause the receiver buffer to overflow if not considered. For example, if the user presses a stop-play button, an RTSP message is sent back to the server to stop streaming. If the buffer is "full" at that time (by design), all the packets in transit will be lost with no where to go in the buffer. Strategies for dealing with "packets in transit" include:

1. Assume that the total available receive buffer is reduced by the amount of the "packets in transit." This is easily calculated from the information provided through feedback packets, for example.
2. When play resumes, the client sends a feedback command to the server instructing the server to start playing from the last packet in the buffer. This strategy causes unnecessary" retransmissions but extends the receive buffer life during periods of low network bandwidth.
3. When the server receives the stop-play command, the server starts transmitting, in a circular fashion, the packets that were dropped (easily calculated from feedback packets). This allows the client to fill in the receive buffer as soon as consumption is resumed without the delay caused by the network. The point where the buffer starts filling may be arbitrary but on the average it fills the receive buffer more quickly. If erasure codes are used when circular retransmission occurs, all packets are equivalent and no gaps occur. This technique is especially good when the forward delay is much larger than the backward delay, so that when consumption resumes, the move to "regular mode" streaming starts immediately.

In an exemplary embodiment of the invention, the transmission rate of equation (1) is filtered in order to provide less abrupt behavior within the transmission network, thereby increasing efficiency in the utilization of the R (5) maximum available bandwidth. The combination of the transmit buffer and the receiver buffer constrain the "filter." The larger the transmit buffer, the better the "plan" for transmission rate control. Ideally, the transmission rate is based on the entire transmission of the electronic data. In practice, however, the transmit buffer is limited in size, e.g., less than 10 MB, thus constraining the servers ability to "look ahead."

In one exemplary embodiment, the filter produces a moving average for the transmission rates that is based on a moving average of the consumption rate. In an alternative exemplary embodiment, the filter is a "path planning" algorithm that modifies the transmission rate such that when the current buffer is consumed it is replaced by data that occupies the optimum buffer size. The algorithm allows minimal fluctuations of the receive buffer in a client in exchange for less volatility in transmit rate fluctuations. It is assumed that the transmit buffer has ordered packets waiting to be transmitted, the number of packets in the transmit buffer is the size of the optimum level of the receive buffer, each packet has a time stamp that represents the time it is to be consumed by the decoder, and the packet sizes are much smaller than the receiver buffer size. The transmit buffer is divided into N sections with each section corresponding to at least one packet.

Together, these sections create a "look ahead" buffer at the server. The instantaneous transmission rate is calculated as shown in equation (2).

$$T=B^o{}_R T" \quad (2)$$

where $B_o$ equals the optimal buffer state of the receive buffer (e.g., the optimum number of bytes contained therein), $T_R$ is the instantaneous transmission rate, and T is the period it takes to consume the entire buffer. T is computed as shown in equation (3).

$$T=T_N-T_{1'} \quad (3)$$

where TN is the timestamp of the last received packet. $T_1$ is the timestamp of the first packet in the receive buffer. In practice this is the time it takes to consume the receive buffer. T continuously changes as the packet consumption rate changes for packets arriving at the client. In an exemplary embodiment, the transmission rate is maintained at a constant level for the duration of the section. The new state of the buffer is calculated as shown in equation (4) based on the actual time to transmit the section.

$$B_{N+1} = S*P - N_c*P + B_{N1} \quad (4)$$

where $B_{N+1}$ is the new estimated buffer state, in bytes, S is the number of packets in a section, and P is the number of bytes in a packet. Nc is calculated from the number of packets the decoder consumes during the transmission period. Nc is calculated using the time it took to transmit the section and the current consumption rate of the decoder at that time, which can be derived from the time stamps on each packet.

In an exemplary embodiment, the next section is transmitted at a rate given by equation (5).

$$T_R = \frac{B^O}{T_N}, \quad (5)$$

where the time TN is the difference in time stamps between the first packet in the receive buffer and the last packet in the receive buffer immediately preceding the next section to be transmitted.

In this approach, the goal is to be in the optimal state of the receive buffer when the current level of data in the receive buffer is completely emptied by the decoder and replaced by new data. This approach necessitates checking every section and continuously computing the state of the buffer.

The algorithm is now described in mathematical terms assuming the division of the packet stream into N sections, each with 5 packets and each packet with P bytes. Thus, the relationship between a section index, "i," and a packet index, "j," is j=S*i.

Next, a sequence N is defined with time stamps of packet being consumed where N is a monotonically increasing function. An inverse function from N to j is defined by equation (6).

$$F^{-1}(N) = j \quad (6)$$

This function accepts a timestamp and returns the sequence number when the time-stamp occurred. This function is obtained either by a progressive search or a binary search (where the search region is divided by 2 each time). Limits on the function may be imposed to improve processing speed.

Assuming that a section is transmitted at a constant rate, the transmission rate does not change for S*P packets. As a result, equation (7) describes the buffer position after transmission of the $I^{th}$ packet.

$$B(i+l) = B_O + S*P*i - \sum_{j=I}^{N=F^{-1}(T(S*i - B(i)/P*))} P \quad (7)$$

Equation (7) describes the state of the buffer as the integrated sum of the number of packets arriving at the buffer as (S*P*i) minus the packets consumed (until the time shown by the expression on the right). The index, "i," stands for a section number and "j" for a packet number. Assuming that the packet size, "P," is a constant, the generalization will be readily apparent to those of skill in the art.

Finally, the transmission rate of section i+1 is defined by equation (8).

$$TR(i+1) = \frac{B}{T(i+B(i)^\sim/P) - T(i)}. \quad (8)$$

Equation (8) represents the "philosophy" of the algorithm. The denominator is the time it takes the decoder to consume the receive buffer and the numerator is the optimum buffer fill position. The idea is to transmit at rate that restores the buffer to its optimum state when the current buffer is completely consumed. In an exemplary embodiment, every section is tested to ensure that a maximum buffer fill level and a minimum buffer fill level are not violated.

The goal is to transmit the next section (which may include many packets) such that by the time the current data in the receive buffer is completely consumed, newly arriving packets fill the buffer to its optimum level. The time that it takes to empty the current buffer (if it did not get any supply of new data) is the difference between the time stamps of the packet at the head of the buffer (which is about to be consumed) and the last packet. This time difference is shown as the denominator. The second term of the denominator is the time stamp of the first packet at the head of the buffer. The first term is the time stamp of the last packet in the buffer. The index of the packet of the first term is the sum of the first packet in the buffer (the index "i" is a packet index) and the last, as the last packet index equals to the buffer state (in bytes) divided by a size of a packet. For example, if the current state of the buffer is 1 MB and a packet size is 1000 bytes, then the number of packets in the buffer is 1 MB divided by 1 KB. Thus, there are 1000 packets in the buffer. Accordingly, if the index of the leading packet is 123,000, the index of the last packet would be 123,000+1000. T(123000+1000) refers to the time stamp of last packet in the buffer. Thus, the denominator is the difference between the time stamp of the first packet and the last. The required transmission rate to fill the buffer to its optimum position Bo is achieved by dividing the optimum buffer size (i.e., the numerator) by the time for the current buffer to fully deplete (i.e., the denominator). In an exemplary embodiment, the transmission rate is continuously updated rather than waiting the entire time set in the denominator to modify the transmission rate.

Figure 3A:
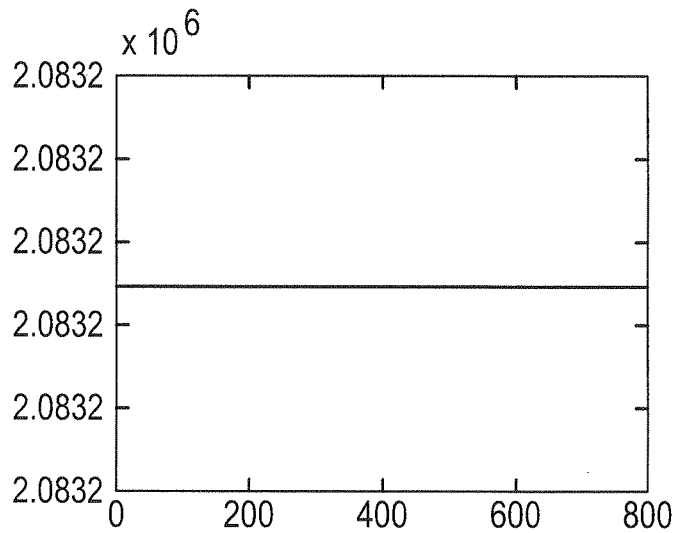
FIG. 3A is a simulation of an input signal of a prior art signal transmission system.
Figure 3B:
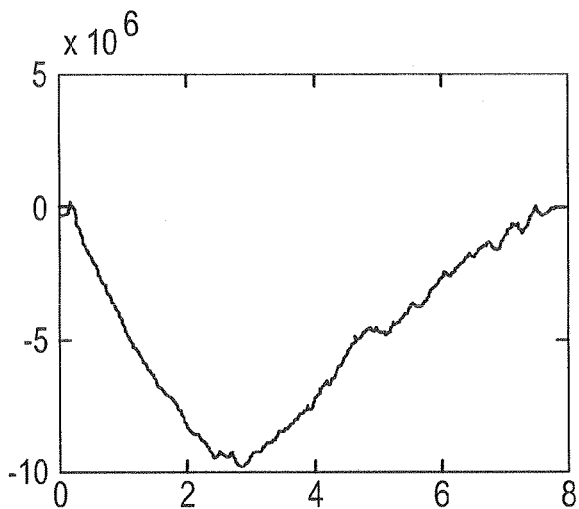
FIG. 3B is a simulation of a needed buffer level to accommodate the input signal of the prior art signal transmission system of FIG. 3A.
Figure 3C:
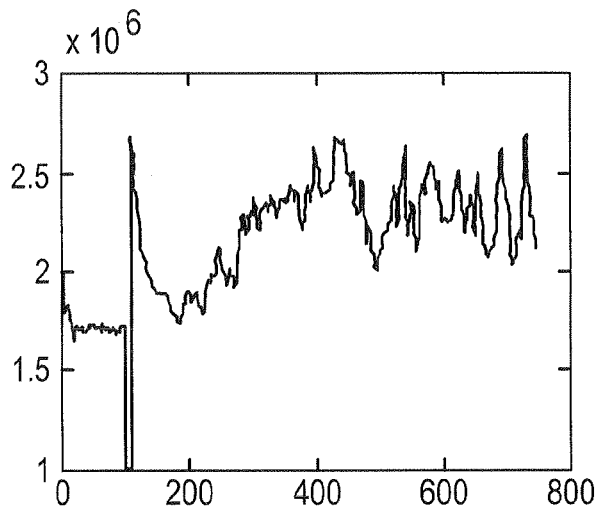
FIG. 3C is a simulation of a input signal in accordance with a signal transmission system of the present invention.
Figure 3D:
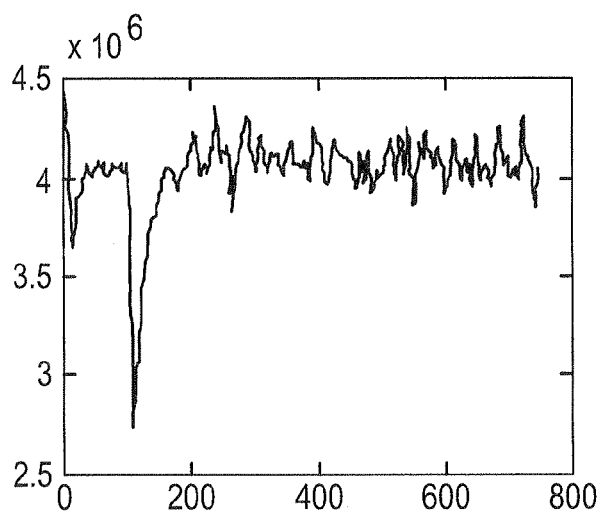
FIG. 3D is a simulation of a receive buffer fill level developed from the input signal of the signal transmission system of FIG. 3C.

In certain exemplary embodiments, more constraints on the transmission rate and/or buffer fill position are employed depending on the system parameters. Tighter restrictions on the transmission rate characteristics translate to larger fluctuations in buffer conditions and reduce the mean fill position of the buffer. Thus, if the buffer size is set very small, the basic algorithm described in equation (1) is achieved, i.e., consumption rate equals transmission rate FIGS. 3A and 3B depict simulations of a prior art transmission system and FIGS. 3C and 3D depict simulations of a transmission system in accordance with exemplary embodiments of the present invention. The simulations depicted in FIG. 3A-3D were created using MATLAB® available from The MathWorks, Inc., 3 Apple Hill Drive, Natick, Mass. 01760, USA.

FIG. 3A depicts a transmission signal having a constant transmission rate (i.e., approximately 2 MHz). FIG. 3B depicts a needed buffer size to avoid interruptions in streaming programming supplied by the constant rate transmission signal of FIG. 3A. As seen in FIG. 3B, a 10 MB buffer is needed to accommodate disruptions in the transmission system as the receive buffer is consumed during such disruptions.

FIG. 3C depicts a transmission signal that varies in accordance with an exemplary embodiment of the present invention. FIG. 3D depicts the variation in the number of bits within a receive buffer of a client receiving the variable transmission rate signal of FIG. 3C. As seen in FIG. 3D a buffer of 5 MB or less (i.e., less than half the size of the buffer in the prior art transmission system) may be used to avoid interruption in streaming programming supplied by the variable rate transmission signal of FIG. 3C. Thus, the necessary buffer size is substantially reduced at the expense of a moderate increase in variability in transmission rate.

In FIG. 3C, the instantaneous transmission rate is shown (in Hz), and in FIG. 3D, the top the buffer fill position is shown (in bytes). Also, a stoppage of communication for a few seconds was inserted after 100 seconds. One can see the quick recovery for full buffer position in FIG. 3D. Also, note that the buffer fill position is not flat due to filtering of the transmission signal as described in detail above. Without the filtering, the buffer position would fluctuate less while variations in the transmission rate would increase.

FIG. 4 is a graph 400 depicting buffer fill level performance in accordance with an exemplary embodiment of the present invention versus buffer fill level performance in a conventional buffer fill level feedback system during a transmission of electronic data. The vertical axis of the graph represents time and the horizontal axis represents a percentage fill level of a receive buffer. A first line 402 represents the percentage fill level of the receive buffer when actively managed in accordance with an exemplary embodiment of the present invention, wherein the receive buffer is filled to approximately 95 percent and maintained at substantially 95%, e.g., +/−5%, for the duration of the transmission. A second line 404 represents the percentage fill level of the receive buffer in the conventional buffer fill level feedback system, wherein the receive buffer is filled to approximately 50 percent and fluctuates widely during the transmission, e.g., +/−25%. Since the percentage fill level of the receive buffer is more tightly controlled in the present invention, smaller receive buffers may be employed than in conventional transmission system without worrying about depletion of the receive buffer during the presentation of electronic data such as VBR packetized data.

It will be recognized by those of skill in the art of network signal processing that the present invention may be implemented in software on a general purpose computer. In this embodiment, one or more functions of the various components and/or method steps described above may be implemented in software that controls the general purpose computer. This software may be embodied in a computer readable device, for example, in a storage medium such as a magnetic or optical disk, or memory card, or in a computer readable carrier, for example, an audio frequency, radio-frequency, or optical carrier wave.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A method comprising:
    at a server, determining, responsive to information contained in one or more data packets, a consumption rate for the one or more data packets transmitted by the server for storage in a receive buffer of a client;
    estimating an at least partially network-based delay period responsive to the consumption rate; and
    adjusting a transmission rate to substantially equal the client consumption rate responsive to the estimated at least partially network-based delay period to actively manage a fill level of the receive buffer;
    wherein the consumption rate is a rate at which the client reads the one or more data packets from the receive buffer.

2. The method of claim 1,
    wherein the one or more data packets comprise electronic data encoded into a plurality of variable bit rate (VBR) packets; and
    wherein the estimating the at least partially network-based delay period comprises:
        estimating a network delay period between transmission of a particular packet by the server and consumption of the particular packet by the client after the transmission; and
        delaying adjusting the transmission rate by the estimated network delay period.

3. The method of claim 1,
    wherein the one or more data packets comprise electronic data encoded into a plurality of variable bit rate (VBR) packets; and
    wherein said determining comprises examining timing information indicating a client processing rate contained in the one or more data packets.

4. The method of claim 2, wherein said determining comprises:
    receiving a current consumption rate from the client; and
    estimating the at least partially network-based delay period responsive to a time to consume the one or more data packets currently in the receive buffer.

5. The method of claim 4, wherein said receiving comprises receiving the current consumption rate using realtime transport control protocol (RTCP).

6. The method of claim 1, wherein said adjusting comprises:
    filtering the transmission rate using a transmit buffer at the server to reduce volatility of the transmission rate.

7. The method of claim 6, wherein the filtering comprises:
    filtering the transmission rate using a path planning algorithm comprising determining a ratio of an optimum fill level of the receive buffer and a time for the client to consume current data stored in the receive buffer in response to the receive buffer not receiving any new data.

8. The method of claim 7, wherein determining the time to consume current data comprises:
    determining the difference between a time stamp of a packet at a head of the receive buffer that is about to be consumed and a time stamp of a last packet in the receive buffer.

9. The method of claim 1, wherein said adjusting comprises:
    maintaining the fill level of the receive buffer at substantially a predefined optimum fill level.

10. The method of claim 1, further comprising filtering the transmission rate using the transmit buffer to reduce volatility of the transmission rate.

11. A buffer management system comprising:
at a client, means for determining a consumption rate at which the client reads packets stored in a receive buffer according to information contained in at least one of the packets;
means for estimating a network-based delay based at least on the consumption rate at which the client reads the packets; and
means for causing adjustment of a transmission rate at which a server transmits the packets to the client for storage in the receive buffer responsive to the consumption rate or the network-based delay.

12. The system of claim 11,
wherein the packets are encoded into a plurality of variable bit rate (VBR) packets; and
wherein said means for causing adjustment comprises:
means for estimating a previous delay period between a first time when a previous packet is transmitted by the server to the client and a second time when the previous packet is actually consumed by the client; and
means for causing adjustment of the transmission rate of the server for a current packet based on the previous packet.

13. The system of claim 11, wherein the electronic data is encoded into a plurality of variable bit rate (VBR) packets; and
wherein said means for determining comprises:
means for examining timing information indicating client processing rate contained in the one or more data packets.

14. The system of claim 11, wherein said means for determining comprises:
means for estimating a delay in accordance with a time to consume the packets currently in the receive buffer.

15. The system of claim 11, wherein said means for causing adjustment comprises:
means for filtering the transmission rate using a transmit buffer at the server to reduce volatility of a fill level of the receive buffer.

16. The system of claim 11, wherein said means for causing adjustment comprises:
means for maintaining a fill level of the receive buffer at substantially a predefined optimum fill level.

17. A computer readable storage medium having instructions stored thereon that, in response to execution by a device, cause the device to perform operations comprising:
determining a consumption rate of a client for one or more data packets having been transmitted by a server for storage in a receive buffer of the client;
estimating an at least partially network-based delay period responsive to determining the consumption rate; and
adjusting a transmission rate of the server to substantially equal the consumption rate of the client responsive to estimated at least partially network-based delay period.

18. The computer readable storage medium of claim 17, wherein the operations further comprises:
filtering the transmission rate using a transmit buffer at the server to reduce volatility of the transmission rate.

19. The computer readable storage medium of claim 17, wherein the operations further comprises:
maintaining the fill level of the receive buffer at substantially a predefined optimum fill level.

20. A device, comprising:
a transmit buffer configured to buffer one or more variable bit rate (VBR) packets; and
controller configured to:
determine a consumption rate for the one or more data packets transmitted from the transmit buffer to a receive buffer of a client;
estimate an at least partially network-based delay period responsive to the consumption rate; and
adjust a transmission rate to substantially equal the consumption rate responsive to the estimated at least partially network-based delay period to actively manage a fill level of the receive buffer;
wherein the consumption rate is a rate at which the client reads the one or more data packets from the receive buffer.

21. The device of claim 20, wherein the controller is further configured to:
estimate a network delay period between transmission of a particular packet by the server and consumption of the particular packet by the client after the transmission; and
delay adjusting the transmission rate by the estimated network delay period.

22. The device of claim 20, wherein the controller is further configured to examine timing information indicating a client processing rate contained in the one or more data packets.

23. The device of claim 22, wherein the controller is further configured to:
receive a current consumption rate from the client; and
estimate the at least partially network-based delay period responsive to a time to consume the one or more data packets currently in the receive buffer.

24. The device of claim 23, wherein the controller is further configured to receive the current consumption rate using real-time transport control protocol (RTCP).

25. The device of claim 20, wherein the controller is further configured to filter the transmission rate using a path planning algorithm comprising determining a ratio of an optimum fill level of the receive buffer and a time for the client to consume current data stored in the receive buffer in response to receipt of no new data by the receive buffer.

26. The device of claim 20, wherein the controller is further configured to maintain the fill level of the receive buffer at substantially a predefined optimum fill level.

* * * * *

UNITED STATES PATENT AND TRADEMARK OFFICE
CERTIFICATE OF CORRECTION

| | | |
|---|---|---|
| PATENT NO. | : 8,046,486 B2 | Page 1 of 1 |
| APPLICATION NO. | : 12/511031 | |
| DATED | : October 25, 2011 | |
| INVENTOR(S) | : Amir et al. | |

It is certified that error appears in the above-identified patent and that said Letters Patent is hereby corrected as shown below:

Column 12, line 2, in Claim 18, delete "comprises:" and insert -- comprise: --.

Column 12, line 6, in Claim 19, delete "comprises:" and insert -- comprise: --.

Column 12, line 34, in Claim 22, delete "packets. *" and insert -- packets. --.

Signed and Sealed this
Fifteenth Day of May, 2012

David J. Kappos
*Director of the United States Patent and Trademark Office*